United States Patent
Zhang et al.

(10) Patent No.: US 10,148,113 B2
(45) Date of Patent: *Dec. 4, 2018

(54) CHARGING METHOD, DEVICE AND CHARGING DEVICE

(71) Applicant: GUANGDONG OPPO MOBILE TELECOMMUNICATIONS CORP., LTD., Dongguan (CN)

(72) Inventors: Jialiang Zhang, Dongguan (CN); Kewei Wu, Dongguan (CN); Jun Zhang, Dongguan (CN); Liangcai Peng, Dongguan (CN); Fuchun Liao, Dongguan (CN)

(73) Assignee: GUANGDONG OPPO MOBILE TELECOMMUNICATIONS CORP., LTD., Dongguan, Guangdong (CN)

( * ) Notice: Subject to any disclaimer, the term of this patent is extended or adjusted under 35 U.S.C. 154(b) by 0 days.

This patent is subject to a terminal disclaimer.

(21) Appl. No.: 15/895,127

(22) Filed: Feb. 13, 2018

(65) Prior Publication Data

US 2018/0175637 A1    Jun. 21, 2018

Related U.S. Application Data

(63) Continuation of application No. 15/115,000, filed as application No. PCT/CN2014/077490 on May 14, 2014, now Pat. No. 9,935,479.

(30) Foreign Application Priority Data

Jan. 28, 2014 (CN) .......................... 2014 1 0043242

(51) Int. Cl.
*H01M 10/44* (2006.01)
*H01M 10/46* (2006.01)
*H02J 7/00* (2006.01)

(52) U.S. Cl.
CPC ............ *H02J 7/007* (2013.01); *H02J 7/0004* (2013.01); *H02J 7/0068* (2013.01); *H02J 7/0073* (2013.01)

(58) Field of Classification Search
CPC ........ H02J 7/007; H02J 7/0013; H02J 7/0093; H02J 7/0077; H02J 7/0052
(Continued)

(56) References Cited

U.S. PATENT DOCUMENTS 9,935,479 B2 *  4/2018  Zhang et al. ........... H02J 7/007
2005/0174094 A1   8/2005  Purdy et al.
(Continued)

FOREIGN PATENT DOCUMENTS

CN    102957193 A    3/2013
JP    2007228643 A    9/2007

OTHER PUBLICATIONS

European Patent Application No. 18172892, Extended Search and Opinion dated Jul. 2, 2018, 10 pages.
(Continued)

*Primary Examiner* — Edward Tso
(74) *Attorney, Agent, or Firm* — Lathrop Gage LLP

(57) ABSTRACT

The present disclosure provides a quick charging method and a quick charging system. A second controller sends a quick-charging request to a first controller. The first controller feeds back a quick-charging permission command. The second controller sends a notification request for obtaining a voltage value of a cell. The first controller obtains the voltage value by a cell connector, and sends the voltage value to the second controller. The second controller finds a current regulation instruction matching a threshold section that the voltage value falls within from a threshold section table, and sends a current regulation instruction to a regulation circuit. The regulation circuit adjusts a current, and
(Continued)

outputs a power supply signal of which the current is regulated.

20 Claims, 5 Drawing Sheets

(58) Field of Classification Search
USPC .................. 320/107, 125, 152, 157, 160
See application file for complete search history.

(56) References Cited

U.S. PATENT DOCUMENTS

2011/0037438 A1    2/2011  Bhardwaj et al.
2016/0352115 A1*  12/2016  Zhang ................... H02J 7/0029

OTHER PUBLICATIONS

Chinese Patent Application No. 201611028570.7, Office Action dated Jul. 13, 2018, 9 pages.
Chinese Patent Application No. 201611028570.7, English translation of Office Action dated Jul. 13, 2018, 9 pages.

* cited by examiner

CHARGING METHOD, DEVICE AND CHARGING DEVICE

CROSS-REFERENCE TO RELATED APPLICATIONS

This application is a Continuation Application of U.S. patent application Ser. No. 15/115,000, having a § 371(c) date of Jul. 28, 2016, which is a National Stage Entry of International Application No. PCT/CN2014/077490, filed on May 14, 2014, which is based on and claims priority to Chinese Patent Application No. 201410043242.9, filed on Jan. 28, 2014, the entire contents of which are incorporated herein by reference.

TECHNICAL FIELD

The present disclosure relates to mobile terminal field, and more particularly to a quick charging method and a quick charging system.

BACKGROUND

As the time progresses, the Internet and the mobile communication network have provided huge amounts of function applications. The users can not only use the traditional applications on the mobile terminals, for example, answering or making calls with smart phones; at the same time, the users can also browse the web pages, transmit pictures, play games and the like on the mobile terminals.

Along with the more frequent using of the mobile terminals, these mobile terminals need to be charged frequently. In addition, along with the users' requirement on the charging speed, some mobile terminals can accept the large current charging without monitoring the charging current. Meanwhile, some charging adaptors have been developed, via which constant charging with larger current can be performed. Although the charging time is reduced to some extent, the constant charging with larger current is easy to cause safety risk, for example, the cell can be overcharged if the charging adaptor still performs the large current charging when the cell is about to be fully charged or the electric quantity of the cell is comparatively sufficient before being charged by the charging adaptor.

SUMMARY

An objective of the present disclosure is to provide a quick charging method and a charging device, so as to solve the problem in the related art that it is easy to overcharge the cell since the charging adapter forcibly charges the cell of the mobile terminal with constant, single and large charging current, without controlling the large current charging for the cell and without controlling the charging current.

In one aspect, the quick charging method provided by the disclosure can be applied to a charging system having a charging adaptor and a mobile terminal, and the quick charging method includes:

with a second controller, sending a quick charging request to a first controller, in which the charging adaptor includes the second controller, and the mobile terminal includes the first controller;

with the first controller, responding to the quick charging request of the second controller, and feeding back a quick charging permission command to the second controller;

with the second controller, sending a notification request for obtaining a voltage value of the cell to the first controller, in which the mobile terminal includes the cell;

with the first controller, responding to the notification request, obtaining the voltage value of the cell via a cell connector, and sending the voltage value of the cell obtained to the second controller, in which the mobile terminal includes the cell connector;

with the second controller, searching a threshold range table for a current regulation command matched with a threshold range containing the voltage value of the cell, and sending the current regulation command to a regulation circuit, in which the charging adaptor includes the regulation circuit, and the threshold range table records one or more threshold ranges and current regulation commands having a mapping relation with the one or more threshold ranges;

with the regulation circuit, performing a current regulation according to the current regulation command, and outputting a power signal after the current regulation.

In another aspect, the quick charging system provided by the present disclosure includes a charging adaptor including a second controller and a regulation circuit, and a mobile terminal including a cell connector, a first controller and a cell.

The second controller is configured to send a quick charging request to the first controller, and further configured to send a notification request for obtaining a voltage value of the cell to the first controller, and further configured to search a threshold range table for a current regulation command matched with a threshold range containing the voltage value of the cell, and to send the current regulation command to a regulation circuit. The charging adaptor includes the regulation circuit, and the threshold range table records one or more threshold ranges and current regulation commands having a mapping relation with the one or more threshold ranges.

The first controller is configured to respond to the quick charging request of the second controller, and to feed back a quick charging permission command to the second controller, and further configured to respond to the notification request, to obtain the voltage value of the cell via the cell connector, and to send the voltage value of the cell obtained to the second controller.

The regulation circuit is configured to perform a current regulation according to the current regulation command, and to output a power signal after the current regulation.

The beneficial effects of the present disclosure is in that, when the charging adaptor can support quick charging, the second controller of the charging adaptor sends the quick charging request to the first controller of the mobile terminal for asking the mobile terminal whether the quick charging can be accepted. If the mobile terminal accepts the quick charging, a quick charging permission command will be fed back to the second controller, and then the charging adaptor performs quick charging on the cell of the mobile terminal. At the same time, the first controller will request the second controller for the voltage value of the cell, and generate a current regulation command according to the voltage value of the cell and the threshold range table, so as to control the regulation circuit to perform the current regulation, such that the regulate circuit outputs the power signal having the current value specified by the current regulation command. The charging adaptor outputs the power signal to charge the cell. In such a way, before performing quick charging to the cell of the mobile terminal, the charging adaptor will inquire the mobile terminal whether accepting quick charging, and control the charging current during the process of charging the cell, thus effectively preventing the cell from being overcharged.

BRIEF DESCRIPTION OF THE DRAWINGS

In order to illustrate the technical solutions in embodiments of the disclosure more clearly, a brief introduction of drawings needed in the description of embodiments of the disclosure or the related art is provided below. Apparently, the drawings in the following description are only some embodiments of the disclosure, and other drawings can be obtained based on these drawings by those skilled in the art without making creative efforts.

DETAILED DESCRIPTION

In order to make the objective, the technical solutions and the advantages of the disclosure more clear, the disclosure is further described in details below in combination with the drawings and the embodiments. It is to be understood that the embodiments described herein are only used to explain the disclosure, but not used to limit the scope of disclosure. In order to illustrate the technical solutions described in the disclosure, the embodiments are used to illustrate as follows.

In embodiments of the present disclosure, the "first" in "first charging interface", "first power wire", "first ground wire" and "first controller" is a substitutive reference. The "second" in "second charging interface", "second power wire", "second ground wire" and "second controller" is also a substitutive reference.

It should be noted that the charging adaptor in embodiments of the disclosure includes a power adaptor, a charger, a terminal, such as an IPAD, a smart phone and any other device that is able to output a power signal to charge a cell (the cell of the mobile terminal).

In embodiments of the disclosure, when the charging adaptor charges the cell of the mobile terminal, by applying a second controller into the charging adaptor and by applying a first controller into the mobile terminal, and based on the communication between the first controller and the second controller, whether there is a need to use the charging adaptor to perform quick charging is confirmed (for example, the second controller inquires the first controller whether there is a need to perform quick charging to the cell of the mobile terminal), and the charging current is regulated during the whole process of charging, which effectively prevents the cell from being overcharged and ensures the quick charging to be performed safely.

Figure 1:
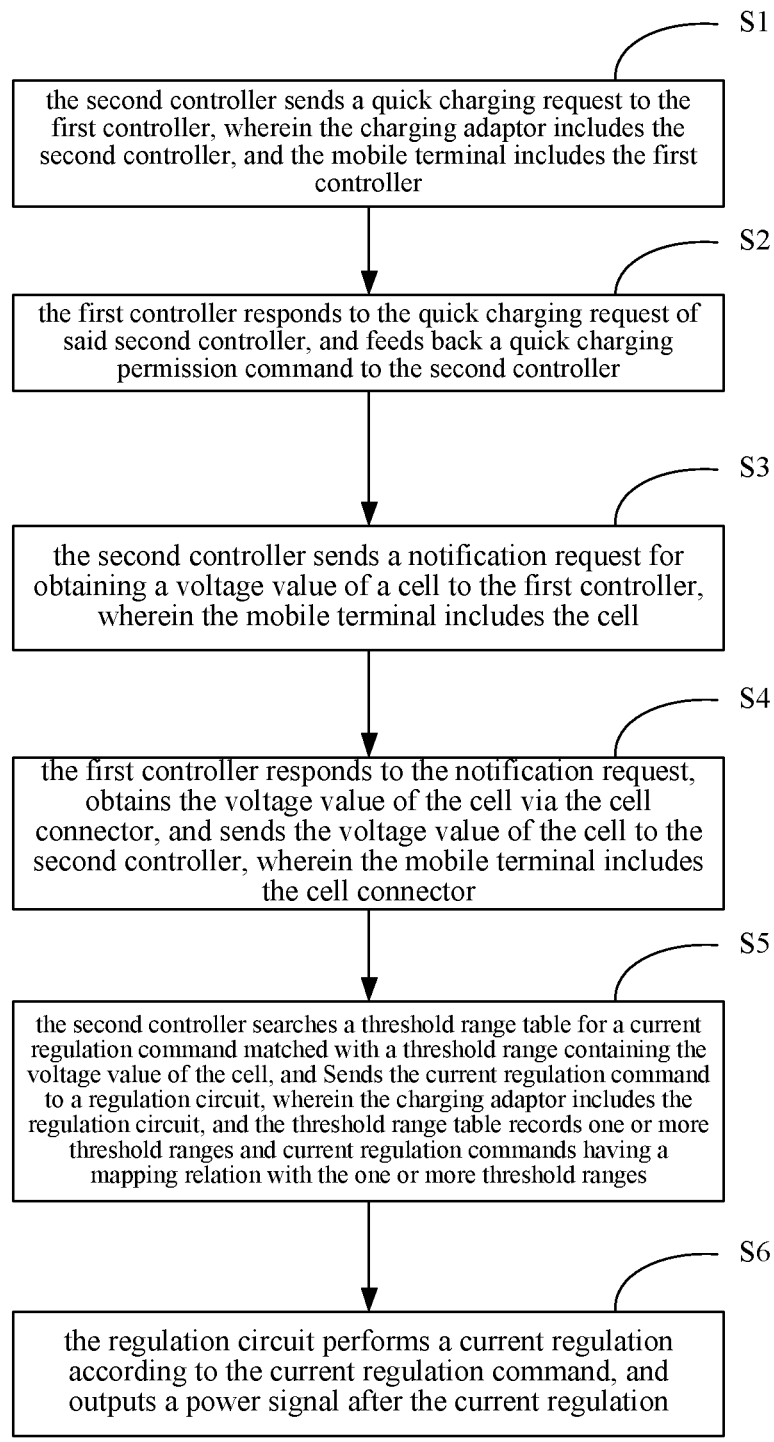
FIG. 1 is a first flow chart of a quick charging method provided by an embodiment of the present disclosure.

FIG. 1 shows a first specific process of a quick charging method provided by an embodiment of the present disclosure. For ease of illustration, only parts related to embodiments of the present disclosure are shown, which are described in detail as follows.

The quick charging method provided by embodiment of the disclosure is applied to a charging system including the charging adaptor and the mobile terminal. The quick charging method includes following steps.

In step S1, a second controller sends a quick charging request to a first controller, in which the charging adaptor includes the second controller, and the mobile terminal includes the first controller.

In step S2, the first controller responds to the quick charging request of the second controller, and feeds back a quick charging permission command to the second controller.

In step S3, the second controller sends a notification request for obtaining a voltage value of the cell to the first controller, in which the mobile terminal includes the cell.

In step S4, the first controller responds to the notification request, obtains the voltage value of the cell via a cell connector, and sends the obtained voltage value of the cell to the second controller, in which the mobile terminal includes the cell connector.

In step S5, the second controller searches a threshold range table for a current regulation command matched with a threshold range containing the voltage value of the cell, and sends the current regulation command to a regulation circuit, in which the charging adaptor includes the regulation circuit, and the threshold range table records one or more threshold ranges and current regulation commands having a mapping relation with the threshold ranges. In at least one embodiment, the threshold range table records one or more current adjusting instructions, and the one or more current adjusting instructions have a one-to-one mapping relation with the one or more threshold ranges.

In step S6, the regulation circuit performs a current regulation according to the current regulation command, and outputs a power signal after the current regulation.

Particularly, in this embodiment, if the charging adaptor used to charge the cell of the mobile terminal is a conventional charging adaptor, the conventional charging adaptor does not have the second controller, and thus cannot send the quick charging request to the first controller for inquiring whether there is a need to perform quick charging. Therefore, when the second controller is applied to the charging adaptor provided by embodiments of the present disclosure and the first controller is applied to the mobile terminal, the whole process of charging can be monitored via the communication between the first controller and the second controller.

If the charging adaptor has the ability of outputting large current, the communication between the first controller and the second controller is carried out by the steps S1 and S2. Particularly, the second controller sends the quick charging request to the first controller, and inquires the first controller via the quick charging request whether charging the cell of the mobile terminal with large current can be accepted. If charging the cell of the mobile terminal with large current can be accepted, the first controller will feed back the quick charging permission command to the second controller, and then the second controller will determine that charging the cell of the mobile terminal with high current is accepted when it receives the quick charging permission command.

Further, the second controller sends the notification request to the first controller, and inquires the first controller about the voltage value of the cell with this notification request. During the whole process of charging, the cell connector coupled to the cell will detect and obtain the voltage value of the cell in real time, and send the obtained voltage value of the cell to the first controller in real time. Once the first controller receives the notification request, it responds to this notification request, and sends the obtained voltage value of the cell to the second controller.

It should be noted that in most cases, it is possible to choose electronic components capable of supporting large current (charging current equal to or greater than 3 A) and/or charging circuits capable of supporting large current (including the charging circuit of the charging adaptor such as a rectifier and filter circuit and a voltage and current regulation circuit, and the charging circuit of the mobile terminal). However, when the cell of the mobile terminal is charged using a constant large current, since impedances such as internal resistance, parasitic resistance and coupling resistance may be introduced into the charging circuits (including the charging circuit in the mobile terminal and the charging circuit in the charging adaptor), more heat dissipation (a large amount of heat) may be generated during the process of charging.

Thus, in this embodiment, when the first charging interface of the mobile terminal is insertion-connected with the second charging interface of the charging adaptor, the charging adaptor can charge the cell of the mobile terminal with large current after steps S1 and S2. In order to reduce charging time and to reduce heat dissipation generated during the charging process, and further in order to prevent the cell from being overcharged, the second controller regulates the current value of the outputted power signal (i.e., regulates the current value of the power signal flowing into the cell) according to the voltage value of the cell obtained in real time and according to the threshold range table.

It is to be understood that there is a threshold range table stored in the second controller, and this threshold range table can be preset according to the control demands corresponding to the charging time and the charging current required for charging the cell. In at least one embodiment, the threshold range table is downloaded to the second controller after being edited by a terminal which has an edit capability.

Furthermore, this threshold range table records one or more threshold ranges, each of which has a voltage upper limit and a voltage lower limit. Meanwhile, the threshold range table also records one or more current regulation commands. Each current regulation command has one corresponding threshold range. In a specific embodiment of the present disclosure, when the detected voltage value of the cell is within the interval range from 0 V to 4.3 V, the charging adaptor outputs a 4 A power signal to charge the cell; when the detected voltage value of the cell is within the interval range from 4.3 V to 4.32 V, the charging adaptor outputs a 3 A power signal to charge the cell; when the detected voltage value of the cell is within the interval range from 4.32 V to 4.35 V, the charging adaptor outputs a 2 A power signal to charge the cell; and when the detected voltage value of the cell is above 4.35 V, the charging adaptor only outputs a power signal of hundreds milliampere (mA) to charge the cell. In such a way, by detecting the voltage of the cell in real time, the charging adaptor outputs large current (charging current equal to or greater than 3 A) to the cell for charging the cell with large current when the voltage of the cell is lower, and further outputs a low current to the cell for charging the cell with low current (charging current of hundreds milliampere) when the detected voltage of the cell reaches the switch-off voltage threshold which means the cell is about to be fully charged. This can not only prevent the cell from being overcharged, but also reduce the charging time. In at least one embodiment, the voltage threshold range composed of all the threshold ranges recorded in this threshold range table is numerically continuous. In such a way, it can ensure that a corresponding current regulation command can be found with respect to each detected voltage value of the cell (the voltage value of the cell).

Further, if the voltage value of the cell received continuously changes from one threshold range to another threshold range, the second controller will send a current regulation command matched with the other threshold range to the regulation circuit.

When receiving the current regulation command, the regulation circuit regulates the power signal output from the charging adaptor, in which the current value of the power signal output from the regulation circuit is equal to the current value specified by the current regulation command.

In another embodiment of the present disclosure, impedances such as internal resistance, parasitic resistance and coupling resistance, may be introduced into the charging circuits (including the charging circuit in the mobile terminal and the charging circuit in the charging adaptor), and the introduced impedances will consume a portion of the current, which causes this portion of current will not flow into the cell of the mobile terminal, therefore, in order to ensure that the current directly flowing into the cell can reach the preset current value, it is necessary to consider the portion of current consumed by the introduced impedances, and further the current value specified by the current regulation command will be greater than the current value of the power signal flowing into the cell. In at least one embodiment, the current value specified by the current regulation command is equal to a sum of the preset current value directly flowing into the cell and the current value of the portion of current consumed by the introduced impedances. For example, if the current value of the power signal expected to flow into the cell is 3.2 A and the current value of the portion of current consumed by the introduced impedances is 0.8 A, the current value specified by the current regulation command (i.e., the current value of the power signal outputted from the charging adaptor) should be set to 4 A.

Figure 2:
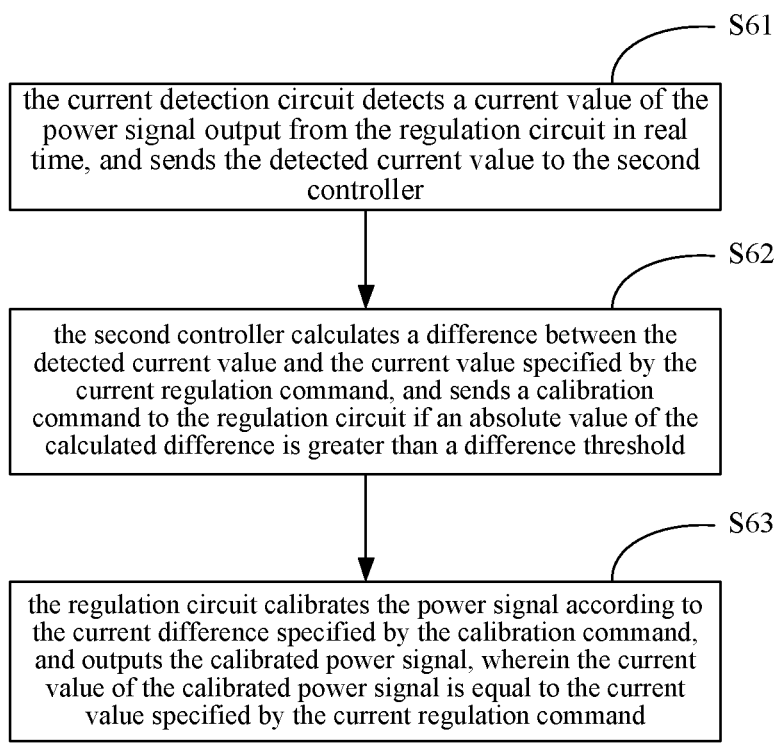
FIG. 2 is a specific flow chart of step S6 in the quick charging method provided by an embodiment of the present disclosure.

FIG. 2 shows a specific process of step S6 in the quick charging method provided by embodiments of the present disclosure, and for illustration, only parts related to the embodiments of the present disclosure is shown, which is described in detail as follows.

In another embodiment of the present disclosure, in order to ensure that the power signal output from the regulation circuit has a large current (has the current value specified by the current regulation command), it is necessary to detect whether the power signal output from the charging adaptor has the current value specified by the current regulation command in real time. Thus, the regulation circuit includes a current detection circuit.

At the same time, the regulation circuit performs the current regulation according to the current regulation command and outputs the power signal after the current regulation as follows.

In step S61, the current detection circuit detects the current value of the power signal output from the regulation circuit, and sends the detected current value to the second controller.

In step S62, the second controller calculates a difference between the detected current value and the current value specified by the current regulation command, and sends a calibration command to the regulation circuit if an absolute value of the calculated difference is greater than a difference threshold.

In step S63, the regulation circuit calibrates the power signal according to the current difference specified by the calibration command, and outputs a calibrated power signal, in which the current value of the calibrated power signal is equal to the current value specified by the current regulation command.

In this embodiment, the regulation circuit has the current detection circuit, which can detect the current value of the power signal output from the regulation circuit (i.e., the current value of the power signal output from the charging adaptor) in real time. In at least one embodiment, the current detection circuit has a current detection resistor, which detects the current value of the power signal output from the regulation circuit in real time and converts the current value to a voltage value, and sends the voltage value to the second controller, such that the second controller determines the current value of the power signal output from the regulation circuit according to the voltage value received and the resistance of the current detection resistor.

Then, the second controller calculates the difference between the detected current value and the current value specified by the current regulation command, calculates the absolute value of the difference, judges whether the absolute value is greater than the difference threshold, and feeds back the calibration command to the regulation circuit if the absolute value of the calculated difference is greater than the difference threshold, such that the regulation circuit regulates the current value of the power signal outputted therefrom in time according to the calibration command. It should be noted that, the difference threshold can be adjusted in advance according to actual working environment of the regulation circuit.

Then, if the regulation circuit receives the calibration command, it represents that the deviation of the current value of the power signal outputted by the regulation circuit from the current value specified by the current regulation command is higher, and it is necessary for the regulation circuit to perform the current regulation again. Particularly, the current regulation can be performed according to the current difference specified by the calibration command, thereby ensuring in real time that the current value of the power signal output from the regulation circuit is equal to the current value specified by the current regulation command.

In an example embodiment of the disclosure, the regulation circuit also includes a voltage and current regulation circuit. The voltage and current regulation circuit performs a rectifying and filtering on the mains supply to obtain an original power signal. In order to calibrate the power signal output from the regulation circuit according to the calibration command, during the process of performing voltage regulation on the voltage of the original power signal, the regulation circuit determines a voltage regulation command according to the current difference specified by the calibration command, and sends the voltage regulation command to the voltage and current regulation circuit. The voltage and current regulation circuit performs the voltage regulation according to the voltage regulation command and outputs the power signal after voltage regulation. Since the power signal after the voltage regulation flows through the current detection resistor, the current value of the power signal after voltage regulation can be re-detected with the current detection resistor for confirming whether the current value of the power signal is equal to the current value specified by the current regulation command. When the current value of the power signal flowing through the current detection resistor (the power signal after voltage regulation) is equal to the current value specified by the current regulation command, the regulation circuit stops determining the voltage regulation command according to the received calibration command and stops sending the determined voltage regulation command to the voltage and current regulation circuit, and the voltage and current regulation circuit stops performing the voltage regulation.

In this way, in order to ensure in real time that the current value of the power signal output from the regulation circuit is equal to the current value specified by the current regulation command, the current detection resistor is used to detect in real time, and when the detected current value is too high or too low, the detected current value is fed back to the second controller. The second controller generates the calibration command according to the current value fed back and sends the calibration command to the regulation circuit. The regulation circuit determines the voltage regulation command according to the calibration command and sends the voltage regulation command to the voltage and current regulation circuit. The voltage and current regulation circuit performs the voltage regulation according to the voltage regulation command, and outputs the power signal after the voltage regulation. Then, it is able to further detect with the current detection resistor whether the current value of the power signal after the voltage regulation is equal to the current value specified by the current regulation command.

Figure 3:
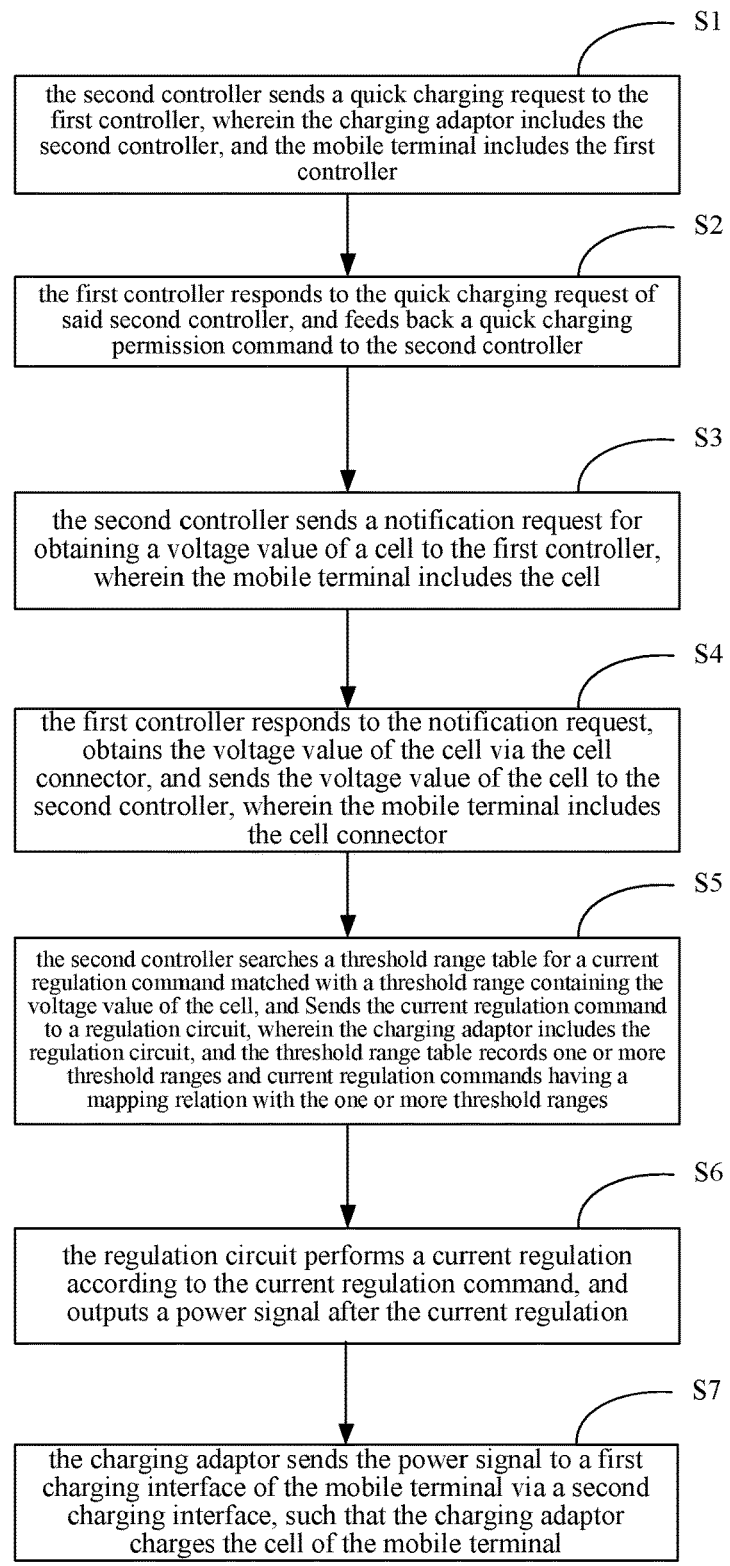
FIG. 3 is a third flow chart of a quick charging method provided by an embodiment of the present disclosure.

FIG. 3 shows a second specific process of the quick charging method provided by embodiments of the present disclosure, and for illustration, only parts related to embodiments of the present disclosure is shown, which is described in detail as follows.

In another embodiment of the present disclosure, after the step that the regulation circuit performs the current regulation according to the current regulation command and outputs the power signal after the current regulation, the quick charging method also includes following steps.

In step S7, the charging adaptor sends the power signal via a second charging interface thereof to a first charging interface of the mobile terminal, so as to charge the cell of the mobile terminal, in which first power wires of the first charging interface are coupled to second power wires of the second charging interface, and first ground wires of the first charging interface are coupled to second ground wires of the second charging interface, there are P first power wires and Q first ground wires, where P is greater than or equal to 2, and Q is greater than or equal to 2.

Particularly, in this embodiment, the common MICRO USB interface (including the MICRO USB interface of the charging adaptor, and also including the MICRO USB interface of the mobile terminal) has only one power wire and one ground wire, so that it is only possible to form the charging circuit with the power wire and the ground wire, and in turn, the charging current is usually only hundreds milliampere, and usually not greater than 3 A.

For this, this embodiment provides the first charging interface that is capable of supporting charging with large current (charging current greater than or equal to 3 A). The first charging interface has at least two first power wires and at least two first ground wires, therefore, via the first charging interface, the mobile terminal can support charging with large current.

In addition, if the charging adaptor coupled to the first charging interface is a conventional charging adaptor such as a charging adaptor using the MICRO USB interface for charging, it is still possible to perform conventional charging (coupling the only power wire and ground wire of the MICRO USB interface to the one first power wire and one first ground wire of the first charging interface correspondingly), which means that only the power wire and ground wire are used to charge the cell.

In at least one embodiment, there are P second power wires and Q second ground wires.

The P first power wires in the first charging interface are correspondingly coupled to the P second power wires in the second charging interface, and the Q first ground wires in the first charging interface are correspondingly coupled to the Q second round wires in the second charging interface.

In this embodiment, when the first charging interface is insertion-connected with the second charging interface, at least two charging circuits can be formed (the number of the charging circuits is the minimum of P and Q). Further, the insertion-connected first charging interface and second charging interface can support charging with large current (charging current equal to or greater than 3 A). Thus, the charging adaptor can output the power signal of large current (for example, 4 A power signal) to charge the cell of the mobile terminal with large current, when the voltage value of the cell is lower (for example, the voltage value of the cell is less than 4.3V).

In at least one embodiment, both the power wire and the ground wire of the conventional MICRO USB interface are made of metal copper foil with the electric conductivity less than 20%. However, in the disclosure, the first power wires and the first ground wires of the first charging interface, and the second power wires and the second ground wires of the second charging interface are made of phosphor bronze C7025 with the electric conductivity up to 50%, so that in case of using at least two charging circuits (including at least two first power wires, at least two first ground wires, at least two second power wires and at least two second ground wires) to charge the cell of the mobile terminal, the charging current is further increased. In at least one embodiment, the first power wires and the first ground wires of the first charging interface, and the second power wires and the second ground wires of the second charging interface provided by embodiments of the present disclosure are made of chromium bronze C18400 with the electric conductivity up to 70%, so that the charging current is further increased.

In another embodiment of the present disclosure, the mobile terminal also includes a switch circuit, and the switch circuit is controlled by the first controller to switch on or off. In such a way, since a switch circuit is further applied into the mobile terminal having the charging circuit, when the second charging interface is coupled with the first charging interface, it is not only able to charge the cell via the charging circuit of the mobile terminal, but also able to control the switch circuit to switch on with the first controller and to charge the cell via the switched-on switch circuit.

In at least one embodiment, after the step that the first controller responds to the quick charging request of the second controller, the quick charging method also includes following steps.

The first controller sends a switch-on command to the switch circuit.

When the switch circuit receives the switch-on command, the switch circuit switches on the charging circuit by which the charging adaptor charges the cell via the switch circuit.

Particularly, when the first controller receives the quick charging request sent from the second controller, and the first controller detects that there is the switch circuit, the cell can be charged via the charging circuit already existing in the mobile terminal and also via the switch circuit, thus realizing charging the cell with large current.

Then, the first controller feeds back the quick charging permission command to the second controller, so as to inform the second controller that: the cell can be charged with large current. At the same time, the first controller also sends the switch-on command to the switch circuit.

The switch circuit, when receiving the switch-on command, is switched on, and further the charging adaptor can charge the cell via the switched on switch circuit while charging the cell of the mobile terminal via the charging circuit already existed in the mobile terminal.

In at least one embodiment, after the step that the first controller obtains the voltage value of the cell via the cell connector, the quick charging method also includes following steps.

The first controller determines whether the obtained voltage value of the cell is greater than the switch-off voltage threshold, and sends a switch-off command to the switch circuit if the obtained voltage value of the cell is greater than the switch-off voltage threshold.

When the switch circuit receives the switch-off command, the switch circuit switches off the charging circuit by which the charging adaptor charges the cell via the switch circuit.

Particularly, during the whole process of charging the cell, the cell connector will always detect and obtain the voltage value of the cell in real time, and send the detected voltage value of the cell to the first controller. When charging the cell via the switch circuit, the first controller judges in real time whether the obtained voltage value of the cell is greater than the switch-off voltage threshold, and sends the switch-off command to the switch circuit if the obtained voltage value of the cell is greater than the switch-off voltage threshold. The switch circuit is switched off when receiving the switch-off command. At this time, the charging adaptor can charge the cell of the mobile terminal only via the charging circuit already existed in the mobile terminal, rather than via the switch circuit which is switched off.

In at least one embodiment, when the obtained voltage value of the cell is greater than the switch-off voltage threshold, the second controller also sends the current regulation command to the regulation current, in which the current regulation command specifies the power signal of small current (for example, hundreds milliampere) outputted from the regulation circuit.

In an embodiment of the present disclosure, the first controller can be a controller existing in the mobile terminal.

In another embodiment of the present disclosure, the mobile terminal not only has a third controller (already configured in the existing mobile terminal) used to handle applications, but also has the first controller. The first controller controls the switch circuit and controls charging the cell of the mobile terminal.

Thus, the first controller transmits the voltage value of the cell received in real time to the third controller, and the third controller determines whether the obtained voltage value of the cell is greater than the switch-off voltage threshold. If the obtained voltage value of the cell is greater than the switch-off voltage threshold, the third controller sends a first switch-off command to the first controller, and then the first controller sends the switch-off command to the switch circuit. In at least one embodiment, the third controller can directly send the switch-off command to the switch circuit if the obtained voltage value of the cell is greater than the switch-off voltage threshold. The switch circuit switches off the charging circuit by which the charging adaptor charges the cell via the switch circuit, when receiving the switch-off command.

In addition, when the first charging interface of the mobile terminal is electrically coupled to the MICRO USB interface of a conventional charging adaptor, the charging can be performed via the charging circuit already existed in the mobile terminal. Based on the fact that the mobile terminal has already got the charging circuit, this embodiment additionally adds a switch circuit into the mobile terminal. Thus, when the second charging interface is insertion-connected with the first charging interface, it is not only able to charge the cell via the charging circuit in the mobile terminal, but also able to control the switch circuit to switch on with the first controller, such that the charging adaptor can charge the cell via the existing charging current and also via the switch circuit which is switched on.

The cell connector is also configured to generate an anode contact signal when detecting whether an anode of the cell is in contact, to generate a cathode contact signal when detecting whether a cathode of the cell is in contact, to generate a temperature signal when detecting a temperature of the cell, and to send the anode contact signal, the cathode contact signal and the temperature signal to the first controller. The first controller transmits the anode contact signal, the cathode contact signal and the temperature signal to the third controller.

Then, the third controller determines whether a positive charging contact point of the charging circuit and the switch circuit of the mobile terminal is in good contact with the anode of the cell according to the received anode contact signal, determines whether a negative charging contact point of the charging circuit and the switch circuit of the mobile terminal is in good contact with the cathode of the cell according to the received cathode contact signal, and determines whether the temperature of the cell exceeds a temperature threshold according to the temperature signal.

Then, the third controller is configured to send the first switch-off command to the first controller, if it is determined that the positive charging contact point is not in good contact with the anode of the cell according to the received anode contact signal, or if it is determined that the negative charging contact point is not in good contact with the cathode of the cell according to the cathode contact signal, or if it is determined that the temperature of the cell has exceeded the temperature threshold according to the temperature signal. Then, the first controller sends the switch-off command to the switch circuit to switch off the switch circuit, which stops the charging adaptor from charging the cell via the switch circuit.

Figure 4:
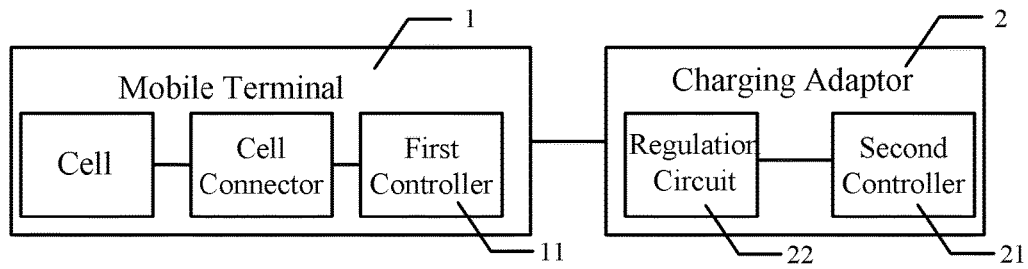
FIG. 4 is a first block diagram of a quick charging system provided by an embodiment of the present disclosure.

FIG. 4 shows a first block diagram of a quick charging system provided by an embodiment of the present disclosure, and for illustration, only parts related to the embodiments of the present disclosure are shown, which is described in detail as follows.

It should be noted that, the quick charging system provided by embodiments of the present disclosure and the quick charging method provided by embodiments of the present disclosure are applicable to each other.

The quick charging system provided by embodiments of the present disclosure includes a charging adaptor 2 having a second controller 21 and a regulation circuit 22, and a mobile terminal 1 having a cell connector, a first controller 11 and a cell.

The second controller 21 is configured to send a quick charging request to the first controller 11, to send a notification request for obtaining a voltage value of the cell to the first controller 11, to search a threshold range table for a current regulation command matched with a threshold range containing the voltage value of the cell, and to send the current regulation command to the regulation circuit 22. The charging adaptor 2 includes the regulation circuit 22, and the threshold range table records one or more threshold ranges and current regulation commands having a mapping relation with the threshold ranges.

The first controller 11 is configured to respond to the quick charging request of the second controller 21, to feed back a quick charging permission command to the second controller 21, to respond to the notification request, to obtain the voltage value of the cell via the cell connector, and to send the obtained voltage value of the cell to the second controller 21.

The regulation circuit 22 is configured to perform the current regulation according to the current regulation command, and to output the power signal after the current regulation.

Figure 5:
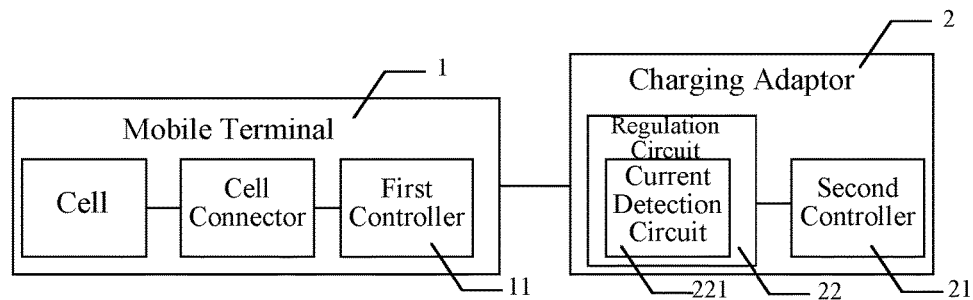
FIG. 5 is a second block diagram of a quick charging system provided by an embodiment of the present disclosure.

FIG. 5 shows a second block diagram of the quick charging system provided by an embodiment of the disclosure, and for illustration, only parts related to embodiments of the disclosure are shown, which is described in detail as follows.

In another embodiment of the disclosure, the regulation circuit 22 includes a current detection circuit 221.

The current detection circuit 221 is configured to detect a current value of the power signal output from the regulation circuit 22, and to send the detected current value to the second controller 21.

The second controller 21 is also configured to calculate a difference between the detected current value and the current value specified by the current regulation command, and to send a calibration command to the regulation circuit 22 if an absolute value of the calculated difference is greater than a difference threshold.

The regulation circuit 22 is also configured to calibrate the power signal according to the current difference specified by the calibration command, and to output the calibrated power signal, in which the current value of the calibrated power signal is equal to the current value specified by the current regulation command.

Figure 6:
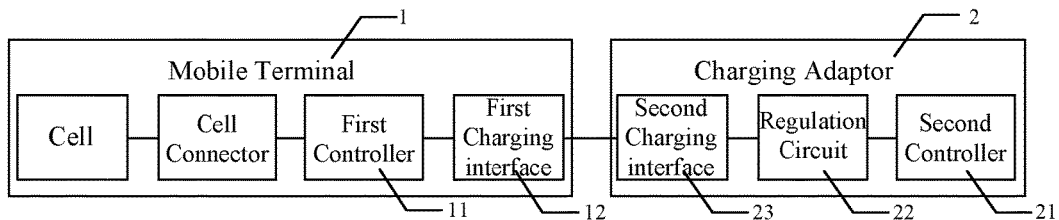
FIG. 6 is a third block diagram of a quick charging system provided by an embodiment of the present disclosure.

FIG. 6 shows a third block diagram of the quick charging system provided by an embodiment of the present disclosure, and for illustration, only parts related to embodiments of the present disclosure are shown, which is described in detail as follows.

In another embodiment of the present disclosure, the charging adaptor 2 further includes a second charging interface 23, and the mobile terminal 1 further includes a first charging interface 12.

The charging adaptor 2 is further configured to send the power signal via the second charging interface 23 to the first charging interface 12, so as to charge the cell of the mobile terminal 1. The first power wires of the first charging interface 12 are coupled to the second power wires of the second charging interface 23, and the first ground wires of the first charging interface 12 are coupled to the second ground wires of the second charging interface 23. The number of the first power wires is P and the number of the first ground wires is Q, where P is greater than or equal to 2, and Q is greater than or equal to 2.

In another embodiment of the present disclosure, the number of the second power wires is P and the number of the second ground wires is Q.

The P first power wires in the first charging interface 12 are correspondingly coupled to the P second power wires in the second charging interface 23, and the Q first ground wires in the first charging interface 12 are correspondingly coupled to the Q second round wires in the second charging interface 23.

Figure 7:
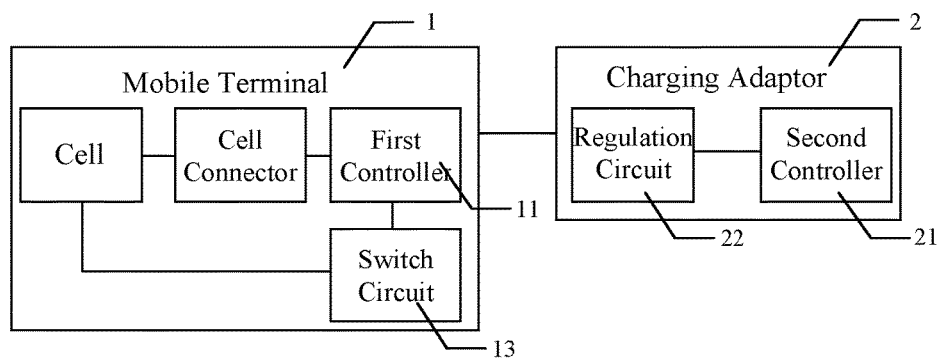
FIG. 7 is a fourth block diagram of a quick charging system provided by an embodiment of the present disclosure.

FIG. 7 shows a fourth block diagram of the quick charging system provided by an embodiment of the present disclosure, and for illustration, only parts related to embodiments of the present disclosure are shown, which is described in detail as follows.

In another embodiment of the present disclosure, the mobile terminal 1 further includes a switch circuit 13.

The first controller 11 is further configured to send a switch-on command to the switch circuit 13, and further configured to determine whether the obtained voltage value of the cell is greater than a switch-off voltage threshold, and to send a switch-off command to the switch circuit 13 if the obtained voltage value of the cell is greater than the switch-off voltage threshold.

The switch circuit 13 is configured to switch on the charging circuit by which the charging adaptor 2 charges the cell via the switch circuit 13 when receiving the switch-on command, and further configured to switch off the charging circuit by which the charging adaptor 2 charges the cell via the switching circuit 13, when receiving the switch-off command.

Figure 8:
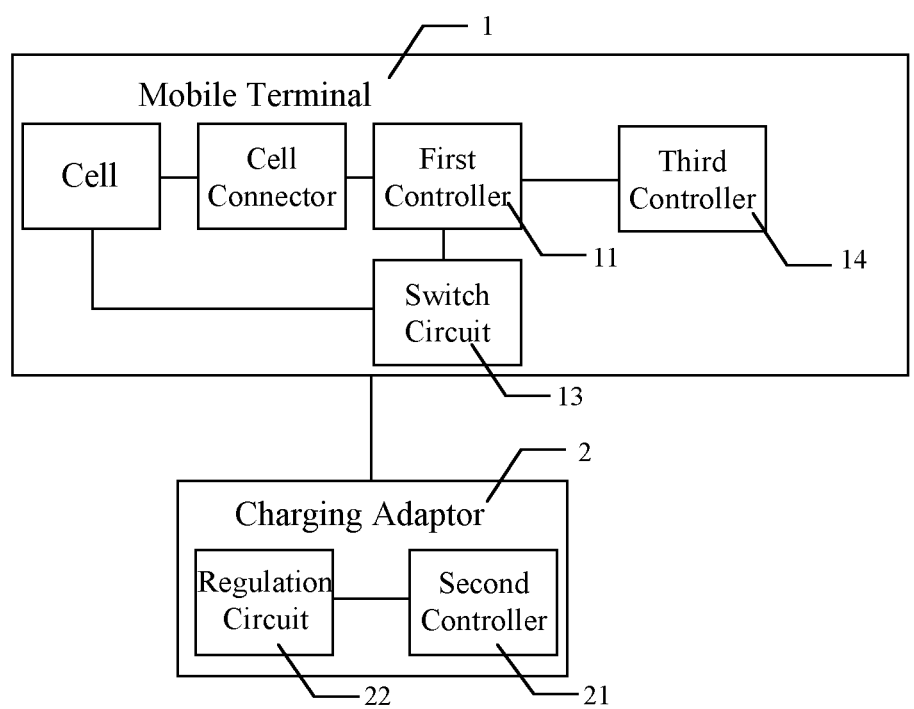
FIG. 8 is a fifth block diagram of a quick charging system provided by an embodiment of the present disclosure.

FIG. 8 is a fifth block diagram showing a quick charging system provided by an embodiment of the present disclosure. For illustration purposes, only parts related to embodiments of the present disclosure are shown, which will be described in detail in the following.

In another embodiment of the present disclosure, the mobile terminal further includes a third controller 14.

The cell connector is configured to generate an anode contact signal when detecting whether an anode of the cell is in contact, to generate a cathode contact signal when detecting whether a cathode of the cell is in contact, to generate a temperature signal when detecting a temperature of the cell, and to send the anode contact signal, the cathode contact signal and the temperature signal to the first controller 11. The first controller 11 transmits the anode contact signal, the cathode contact signal and the temperature signal to the third controller 14.

The third controller 14 is configured to determine whether a positive charging contact point of the charging circuit and the switch circuit 13 of the mobile terminal 1 is in good contact with the anode of the cell according to the received anode contact signal, to determine whether a negative charging contact point of the charging circuit and the switch circuit 13 of the mobile terminal 1 is in good contact with the cathode of the cell according to the received cathode contact signal, to determine whether the temperature of the cell exceeds a temperature threshold according to the temperature signal, and to send the first switch-off command to the first controller 11, if it is determined that the positive charging contact point is not in good contact with the anode of the cell according to the received anode contact signal, or if it is determined that the negative charging contact point is not in good contact with the cathode of the cell according to the cathode contact signal, or if it is determined that the temperature of the cell has exceeded the temperature threshold according to the temperature signal.

The first controller 11 is further configured to send the switch-off command to the switch circuit 13 to switch off the switch circuit 13, which stops the charging adaptor 2 from charging the cell via the switch circuit 13.

The forgoing description is only directed to preferred embodiments of the present disclosure, but not used to limit the present disclosure. For those skilled in the art which the present disclosure belongs to, all modifications, equivalents, variants and improvements made within the spirit and principle of the present disclosure shall fall within the protection scope of the present disclosure defined by appended claims.

What is claimed is:

1. A charging method, applied to a charging device and comprising:
   sending a quick-charging request to a device needing to be charged;
   receiving a quick-charging permission instruction in response to the quick-charging request from the device needing to be charged;
   sending a notification request for obtaining a voltage value of a cell of the device needing to be charged to the device needing to be charged;
   receiving the voltage value of the cell in response to the notification request from the device needing to be charged;
   performing current regulation based on the voltage value of the cell and outputting a power signal after the current regulation to charge the cell.

2. The method according to claim 1, wherein, performing the current regulation based on the voltage value of the cell, comprises:
   searching a threshold segment table to find a current regulation instruction matched with a threshold segment containing the voltage value of the cell, wherein the threshold segment table records one or more threshold segments and current regulation instructions having a mapping relation with the threshold segments;
   performing the current regulation based on the current regulation instruction.

3. The method according to claim 1, further comprising:
   detecting a current value of the power signal;
   obtaining a difference between the detected current value and a current value specified by the current regulation instruction;
   calibrating the power signal when an absolute value of the difference is greater than a difference threshold;
   outputting the power signal after the calibration, wherein a current value of the power signal after the calibration is equal to the current value specified by the current regulation instruction.

4. The method according to claim 1, wherein outputting the power signal comprises:
   outputting the power signal to a first charging interface of the device needing to be charged via a second charging interface of the charging device.

5. The method according to claim 1, further comprising:
   detecting abnormal charging information; and
   sending a switch-off instruction based on the abnormal charging information to the device needing to be charged.

6. The method according to claim 1, further comprising:
   detecting abnormal charging information; and
   switching off a charging circuit for charging the cell by the charging device based on the abnormal charging information.

7. The method according to claim 2, wherein a current value specified by the current regulation instruction is equal to a sum of a present current value flowing into the cell and a current value consumed by impedance introduced into a charging circuit for charging the cell by the charging device.

8. A device, comprising:
a first controller, configured to, receive a quick-charging request from a charging device, send a quick-charging permission instruction in response to the quick-charging request to the charging device, and receive a notification request in response to the quick-charging permission instruction from the charging device, to obtain a voltage value of a cell of a device needing to be charged based on the notification request, and to send the voltage value of the cell to the charging device, such that the device needing to be charged receives a power signal outputted by the charging device after the charging device performs current regulation based on the voltage value of the cell, to charge the cell.

9. The device according to claim 8, further comprising a cell connector, wherein
the first controller is further configured to send the notification request to the cell connector;
the cell connector is configured to obtain the voltage value of the cell based on the notification request and to send the voltage value of the cell to the first controller.

10. The device according to claim 8, further comprising a first switch circuit, wherein,
the first controller is further configured to send a switch-on instruction in response to the quick-charging request to the first switch circuit,
the first switch circuit is configured to switch on a charging circuit for charging the cell by the charging device based on the switch-on instruction;
the first controller is further configured to determine whether the voltage of the cell is greater than a turn-off voltage threshold, and to send a switch-off instruction to the first switch circuit when the voltage of the cell is greater than the turn-off voltage threshold;
the first switch circuit is further configured to switch off the charging circuit for charging the cell by the charging device based on the switch-off instruction.

11. The device according to claim 8, further comprising:
a first charging interface, configured to receive the power signal outputted from a second charging interface of the charging device.

12. The device according to claim 11, wherein the first charging interface comprises P first power wires and Q first ground wires,
the P first power wires are configured to be coupled to power wires of the second charging interface correspondingly, the Q first ground wires are configured to be coupled to ground wires of the second charging interface correspondingly, P is greater than or equal to 2, and Q is greater than or equal to 2.

13. A charging device, comprising:
a controller, configured to, send a quick-charging request to a device needing to be charged, receive a quick-charging permission instruction in response to the quick-charging request from the device needing to be charged, send a notification request for obtaining a voltage value of a cell of the device needing to be charged to the device needing to be charged, receive the voltage value of the cell in response to the notification request from the device needing to be charged, and control the charging device to perform current regulation based on the voltage value of the cell to output a power signal after the current regulation, to charge the cell.

14. The charging device according to claim 13, further comprising a regulation circuit,
wherein the controller is further configured to, search a threshold segment table to find a current regulation instruction matched with a threshold segment containing the voltage value of the cell and send the current regulation instruction to the regulation circuit, wherein the threshold segment table records one or more threshold segments and current regulation instructions having a mapping relation with the threshold segments;
the regulation circuit is configured to perform the current regulation based on the current regulation instruction.

15. The charging device according to claim 12, wherein the regulation circuit comprises a current detection circuit;
the current detection circuit is configured to detect a current value of the power signal outputted from the regulation circuit, and to send the detected current value to the controller;
the controller is further configured to obtain a difference between the detected current value and a current value specified by the current regulation instruction, and to send a calibration instruction to the regulation circuit when an absolute value of the difference is greater than a difference threshold;
the regulation circuit is further configured to calibrate the power signal based on the calibration instruction, and to output the power signal after the calibration, wherein a current value of the power signal after the calibration is equal to the current value specified by the current regulation instruction.

16. The charging device according to claim 13, further comprising:
a second charging interface, configured to output the power signal to a first charging interface of the device needing to be charged under a control of the first controller.

17. The charging device according to claim 16, wherein, the second charging interface comprises P second power wires and Q second ground wires,
the P second power wires are configured to be coupled to power wires of the first charging interface correspondingly, the Q first ground wires are configured to be coupled to ground wires of the first charging interface correspondingly, P is greater than or equal to 2, and Q is greater than or equal to 2.

18. The charging device according to claim 13, wherein the controller is further configured to detect abnormal charging information and to send a switch-off instruction based on the abnormal charging information to the device needing to be charged.

19. The charging device according to claim 13, wherein the controller is further configured to detect abnormal charging information and to switch off a charging circuit for charging the cell by the charging device based on the abnormal charging information.

20. The charging device according to claim 14, wherein a current value specified by the current regulation instruction is equal to a sum of a present current value flowing into the cell and a current value consumed by impedance introduced into a charging circuit for charging the cell by the charging device.

* * * * *